United States Patent [19]

Matsui

[11] Patent Number: 4,648,576
[45] Date of Patent: Mar. 10, 1987

[54] MOUNTING STRUCTURE FOR POWER UNIT

[75] Inventor: Tetsu Matsui, Kasugai, Japan

[73] Assignee: Tokai Rubber Industries, Ltd., Aichi, Japan

[21] Appl. No.: 803,296

[22] Filed: Dec. 2, 1985

[30] Foreign Application Priority Data

Dec. 5, 1984 [JP] Japan .................. 59-257128

[51] Int. Cl.$^4$ ............................. F16M 13/00
[52] U.S. Cl. .................... 248/550; 180/300;
248/566; 248/636; 248/638; 248/659;
267/140.1
[58] Field of Search ............... 248/559, 550, 659, 636,
248/562, 563, 566; 267/140.1, 8 D, 141.2, 141.3;
180/300; 188/282, 317, 322.15, 379, 280, 275,
298

[56] References Cited

U.S. PATENT DOCUMENTS 4,516,545  5/1985  Kumagai .................. 248/550 X

FOREIGN PATENT DOCUMENTS

| 112440 | 8/1980 | Japan | 267/140.1 |
| 129944 | 12/1982 | Japan | 267/140.1 |
| 54-247 | 3/1983 | Japan | 267/140.1 |
| 199220 | 11/1983 | Japan | 267/140.1 |

Primary Examiner—J. Franklin Foss
Attorney, Agent, or Firm—Parkhurst & Oliff

[57] ABSTRACT

A mounting structure disposed between a body and a power unit of a vehicle, including a cylindrical housing having two cavities on opposite side of a partition member, and a first and a second elastic member which close open ends of the cavities to form a first and a second variable-volume fluid chamber which are filled with an incompressible fluid. The first and second fluid chambers communicate with each other through an orifice which permits a restricted flow of the fluid therethrough. The elastic members and the orifice enable the mounting structure to damp or absorb vibrations applied thereto. The mounting structure comprises: portions defining at least one by-pass passage formed through the partition member to permit communication between the first and second fluid chambers; a rotary valve member disposed within the partition member and rotatable about its axis between its closed position in which the at least one by-pass passage is closed by the rotary valve member, and its open position in which the at least one by-pass passage is open; and a rotary actuator, responsive to an external signal, for operating the rotary valve member between the closed and open position.

9 Claims, 7 Drawing Figures

MOUNTING STRUCTURE FOR POWER UNIT

BACKGROUND OF THE INVENTION

Field of the Art

The present invention relates in general to an elastic mounting structure disposed between a body of a vehicle and a power unit for mounting the power unit on the vehicle body, and more particularly to a fluid-filled elastic vibration-damping structure which is capable of selectively exhibiting high vibration-damping characteristics and high vibration-isolating characteristics, depending upon the conditions of the vehicle.

In the prior art of installing a power unit (consisting of an engine, a transmission and other components as a unit) to a rigid support member of a vehicle, there has been known an elastic or resilient mounting structure, which is interposed between the power unit and the rigid member of the vehicle so as to support the power unit, while insulating or isolating operational vibrations of the engine from the vehicle body, and damping or attenuating vibrations of the vehicle body and the engine from the road surface while the vehicle is running.

Such mounting structure is generally required to exhibit vibration-damping characteristics for damping low-frequency vibrations (of lower than 10 Hz) of the vehicle body during running of the vehicle on bumpy road surfaces, and vibration-isolating characteristics for isolating or insulating vibrations of comparatively higher frequencies (of higher than several tens of Hz) of the power unit. In a conventional mounting structure using an elastic isolator member disposed between two rigid members, the above-indicated two different characteristics are not available. If the elastic member is made of a rubber material which has a high damping effect, its spring rate (or constant) is too high to effectively isolate the vibrations in a relatively high frequency range. On the other hand, if the elastic member is formed of a rubber material having a relatively high spring rate to provide a comparatively high vibration-isolating capability, its loss factor is reduced and its vibration-damping capability is accordingly reduced.

In particular, the mounting structure is required to have a high dynamic rigidity and exhibit high vibration-damping characteristics for attenuating vibrations of the power unit of relatively high amplitude, when the engine undergoes shaking vibrations (resonance of the engine mass-mounting spring system) during running of the vehicle, or when the engine torque is rapidly changed upon a sudden start or acceleration of the engine. On the other hand, the mounting structure is required to have a low dynamic rigidity and a low dynamic spring rate for isolating the vibrations of the power unit from the vehicle body while the engine is idling or while the vehicle is running at a high speed. However, none of the known mounting structures have been found to satisfy these two different needs.

In the meantime, various fluid-filled elastic bushings have been proposed, which are adapted to damp or absorb vibrations by means of a resistance to flow of a fluid through a suitable orifice, as well as elastic deformation of an elastic member. Examples of such fluid-filled elastic bushings are disclosed in Japanese Patent Applications which were laid open in 1978 and 1982 under Publication Nos. 53-5376 and 57-9340, respectively. These fluid-filled bushings have an orifice which permits restricted flows of a fluid between two fluid chambers, with a predetermined resistance to flows of the fluid through the orifice, thereby enabling the bushings to perform a vibration-damping function.

Although such a fluid-filled elastic bushing is effective for damping low-frequency vibrations of high amplitude such as shaking vibrations of an engine, the bushing is not satisfactory for isolation or insulation of idling vibrations of the engine in a frequency range of about 5–40 Hz which overlaps the frequency range of the shaking vibrations. More specifically, while the engine is idling with the vehicle stopped, it is more important to prevent the idling vibrations of the engine due to fluctuation of its torque, from being transmitted to the vehicle body, rather than to damp or attenuate such idling vibrations. To this end, the elastic bushing must exhibit a low dynamic spring rate, i.e., soft spring characteristics. However, the restriction of the fluid flow by the orifice will increase the dynamic rigidity of the fluid-filled bushing. In other words, the high-damping characteristics for the low-frequency shaking vibrations of the engine is incompatible with the soft spring characteristics for the idling vibrations of the engine which fall in the same low frequency range.

SUMMARY OF THE INVENTION

It is accordingly an object of the present invention to provide a fluid-filled mounting structure of simple construction for mounting a power unit to a vehicle body, which selectively exhibits a high isolating capability as well as a high damping capability, for low-frequency vibrations, depending upon the conditions of the vehicle and the power unit.

According to the present invention, there is provided a mounting structure disposed between a body and a power unit of a vehicle for mounting of the power unit on the body, including (a) partition means, (b) a first and a second elastic member which cooperate with the partition means to define at least partially a first and a second fluid chamber on opposite sides of the partition means, respectively, the first and second fluid chambers being filled with an incompressible fluid and having volumes which are variable due to elastic deformation of the elastic members, respectively, and (c) means for defining an orifice which communicates with the first and second fluid chambers to permit a restricted flow of the fluid therebetween, the orifice providing a predetermined resistance to flow of the fluid therethrough, the elastic deformation of the elastic members and the flow resistance of the orifice enabling the mounting structure to damp, absorb or isolate vibrations applied thereto, the mounting structure comprising: by-pass means for defining at least one by-pass passage formed through the partition means to permit fluid communication between the first and second fluid chambers; a rotary valve member disposed within the partition means and rotatable about its axis through a predetermined angle between its closed position in which the above-indicated at least one by-pass passage is closed by the rotary valve member, and its open position in which the at least one by-pass passage is open; and a rotary actuator, responsive to an external signal, for operating the rotary valve member between the closed and open position.

In the mounting structure constructed as described above, the by-pass passage or passages which communicate(s) with the first and second fluid chambers is/are selectively closed and opened by the rotary valve member which is operated by the rotary actuator, to enable the mounting structure to perform an effective vibration-damping function or alternatively a high vibration-isolating function with a reduced dynamic rigidity, depending upon the operating conditions of the vehicle. More specifically, when the byh-pass passage is closed by the rotary valve member, the first and second fluid chambers communicate with each other through the orifice. In this condition, the flow restriction or resistance by the orifice enables the mounting structure to exhibit high vibration-damping characteristics, i.e., effectively and quickly damp or attenuate low-frequency vibrations of a high amplitude such as shaking vibrations of the engine of the power unit.

On the other hand, when the by-pass passage is opened with the rotary valve member rotated to its open position by the rotary actuator, the fluid is permitted to flow freely between the first and second fluid chambers through the by-pass passage. In this condition, the elastic members are easily deformable, contributing to a reduction in dynamic spring rate of the mounting structure as a whole. Accordingly, the engine idling vibrations while the vehicle is stopped are effectively isolated from the vehicle body.

As indicated above, the present mounting structure is capable of exhibiting high vibration-damping characteristics as well as soft spring characteristics with reduced dynamic spring rate, for damping and isolating low-frequency vibrations in the same frequency range, for example, of 5–40 Hz. These two different characteristics, which are incompatible with each other on a known mounting structure, are selectively available on the present mounting structure, depending upon the specific operating or running conditions of the vehicle.

Further, the mounting structure may be compact, even with the rotary valve member and the rotary actuator incorporated within the structure. The rotary valve member to close and open the by-pass passage is disposed within the partition means of the structure such that the valve member is rotatable about its axis, and the rotary actuator to operate the rotary valve member is also built in the structure. Thus, the present mounting structure which incorporates the above-indicated mechanism for selective vibration-damping and -isolating capabilities, does not require a larger installation space between the vehicle body and the power unit, than is needed for a conventional mounting structure which is not equipped with such mechanism.

According to a preferred embodiment of the invention, the mounting structure further comprises pressure-receiving means which is disposed to receive at least one of pressures in the first and second fluid chambers, and is movable in a direction to reduce the pressure which has moved the pressure-receiving means. In this embodiment, the mounting structure may exhibit high vibration-isolating characteristics for high-frequency vibrations, in addition to the aforementioned two different characteristics which are selectively available for the low-frequency vibrations. Namely, the pressure-receiving means contribute to reducing noises while the vehicle is running at a high speed.

Described in more detail, the pressure-receiving means provided in the above preferred form of the invention is oscillated in response to variations in at least one of the pressures in the first and second fluid chambers, so as to restrain the pressure rise in the first and/or second fluid chamber(s). This arrangement is effective to reduce high-frequency vibrations of the engine, for example in an audio range of higher than 100 Hz, that are transmitted to the vehicle body.

Thus, the oscillation of the pressure-receiving means upon transmission of high-frequency vibrations from the power unit to the mounting structure will result in absorbing or accommodating a portion of the vibrational energy which is otherwise transmitted to the vehicle body, whereby the noises which occur due to such high-frequency vibrations during running of the vehicle may be sufficiently reduced.

BRIEF DESCRIPTION OF THE DRAWINGS

The above and other objects, features and advantages of the present invention will become more apparent from reading the following description of the preferred embodiments taken in connection with the accompanying drawings in which.

DETAILED DESCRIPTION OF THE PREFERRED EMBODIMENT

To further clarify the present invention, a couple of preferred embodiments of a mounting structure of the invention will be described in greater detail, referring to the accompanying drawings.

Figure 1:
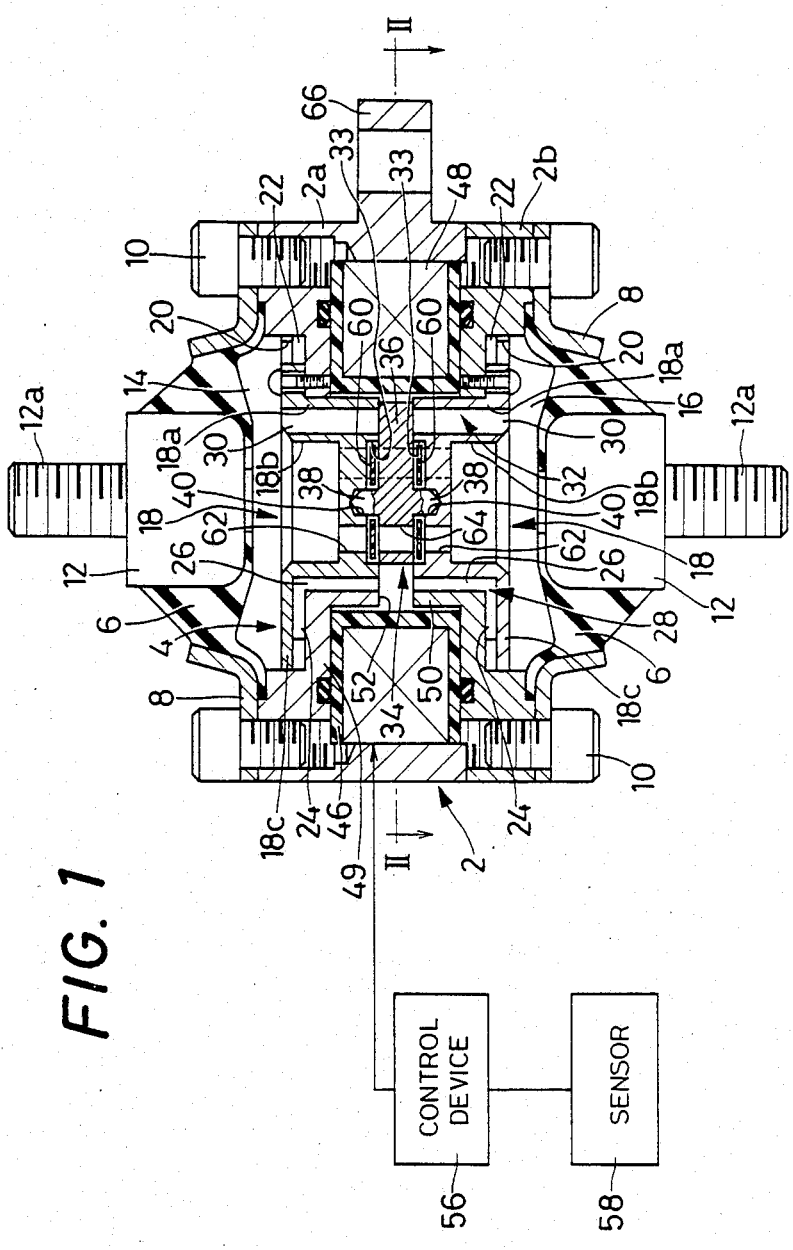
FIG. 1 is an elevational view in longitudinal cross section of an embodiment of a mounting structure of the present invention, taken along line I—I in FIG. 2.

Referring first to FIG. 1, there is illustrated one embodiment of a mounting structure of the present invention. In the figure, reference numeral 2 designates a metal housing of a cylindrical shape which consists of two longitudinal sections 2a and 2b. Partition member 4 is disposed within the cylindrical metal housing 2 so as to divide the interior of the metal housing 2 into two spaces on opposite sides of the partition member 4. Thus, the metal housing 2 and the partition member 4 cooperate to constitute partition means for defining two cavities which are spaced apart from each other by the partition member 4 in the longitudinal direction of the metal housing 2. These two cavities are open at longitudinal opposite ends of the metal housing 2, and the corresponding open ends of the cavities are closed by a pair of elastic bodies 6 made of a suitable rubber material. More specifically, each of the elastic bodies 8 is secured at its outer periphery to an annular bracket 8 by means of vulcanization during molding of the elastic body. The annular bracket 8 is fixed to the corresponding open end of the metal housing 2 by bolts 10, such that the corresponding cavity is fluid-tightly closed by the elastic body 6. In the radially central portion of each elastic body 6, there is partially embedded a metallic mounting member 12 which includes an externally threaded stem portion 12a extending outwardly away from the elastic body 6 along the axis of the metal housing 2. The mounting member 12 fixed to the elastic bodies 6 are used for attachment of the mounting structure to a body of a vehicle and to a power unit on the vehicle, for mounting the power unit on the vehicle body.

As is apparent from the foregoing description, the metal housing 2, the elastic bodies 6, 6 on the opposite axial ends of the metal housing 2, and the partition member 4, cooperate to define the fluid-tightly enclosed cavities, that is, a first and a second fluid chamber 14, 16 on the opposite sides of the partition member 4. These first and second fluid chambers 14, 16 are filled with a suitable incompressible fluid such as polyalkylene glycols, alkylene glycols, silicone oil, low molecluar weight polymers, water, or a mixture thereof.

The partition member 4 consists of a pair of partition blocks 18, 18 which are spaced apart axially of the metal housing 2, i.e., in the vertical direction of FIG. 1. The partition member 4 is disposed within a stepped-diameter bore formed through the metal housing 2. The stepped-diamter bore has a comparatively small diamter at its axially intermediate portion, and a comparatively large diamter at its axially opposite end portions. Each of the partition blocks 18 consists of a cylindrical cup-shaped portion 18a having a central hole 18b, and an annular flange portion 18c which extends radially outwardly from the open end of the central hole 18b. The two partition blocks 18 are disposed such that the cup-shaped portions 18a are located within the small-diamter intermediate portion of the stepped-diamter bore of the metal housing 2, with their bottom surfaces facing each other, and such that the annular flange portions 18c are fitted in the corresponding large-diamter end portions of the stepped-diamter bore. The annular flange portions 18c are secured with screws to upper and lower shoulder surfaces of the metal housing 2. Each partition block 18 has a through-hole 20 which is formed through a radially outer part of the annular flange portion 18c. This through-hole 20 communictes with a circumferential passage 22 which is formed between the metal housing 2 and the partition block 18, over a suitable distance along the circumference of the annular flange portion 18c of the partition block 18, such that the circumferential passage 22 is located inwardly of the annular flange portion 18c in the axial direction of the metal housing 2. The circumferential passage 22 is connected at its one end to a radial passage 24 which communicates with an axial passage 26. These radial and axial passages 24, 26 are defined by the partition block 18 and the inner surfaces of the metal housing 2. The through-hole 20 formed in one of the partition blocks 18 communicates with the first fluid chamber 14, while the through-hole 20 in the other partition block 18 communicates with the second fluid chamber 16. In the meantime, the axial passage 26 leading to the fluid chamber 14 is held in communication with the axial passage 26 leading to the fluid chamber 16, whereby the two fluid chambers 14 and 16 communicate with each other. The above-indicated through-holes 20, circumferential passages 22, radial passages 24 and axial passages 26 constitute an orifice indicated generally at 28 in FIG. 1. The orifice 28 provides a predetermined resistance to a flow of the incompressible fluid therethrough, thus permitting a restricted flow of the fluid between the two fluid chambers 14, 16. This restricted flow of the fluid enables the present mounting structure to serve as a vibration damper.

Figure 2:
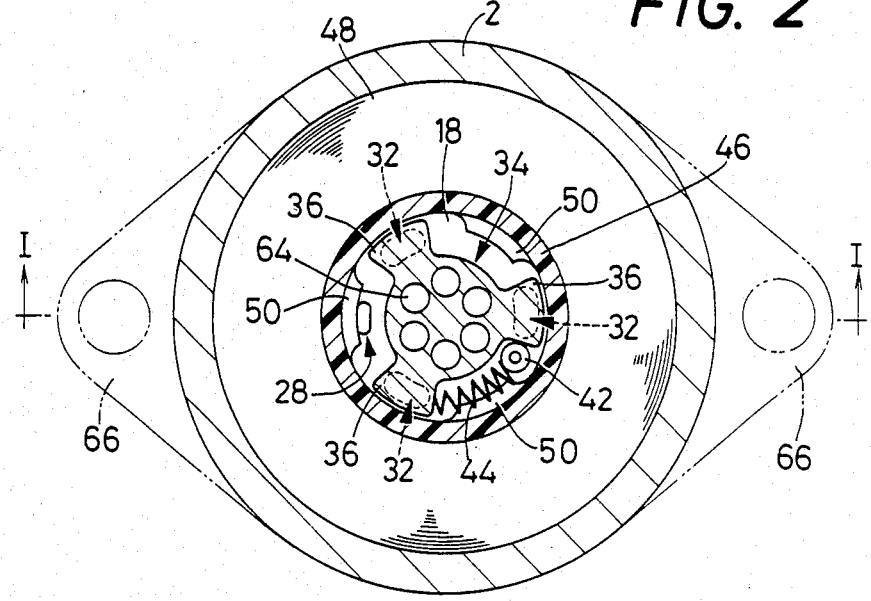
FIG. 2 is a cross sectional view taken along line II—II of FIG. 1, showing one operating position of the mounting structure.

In the meantime, the fluid chambers 14, 16 communicate with each other through three by-pass passages 32, as shown in FIG. 2. Each of the three by-pass passages 32 consists of two communication holes 30, 30 (FIG. 1) each of which is formed through the cylindrical wall of the cup-shaped portion 18a of each partition block 18 along its axis. The two communication holes 30 forming each of the three by-pass passages 32 are formed at the same circumferential positions of the cup-shaped portions 18a of the partition blocks 18, so that the hole 30 in the upper partition block 18 is aligned with the corresponding hole 30 in the lower partition block 18. As indicated in FIG. 2, the three by-pass passages 32 are equally spaced from each other in the circumferential direction of the partition blocks 18. The by-pass passages 32 have a shorter length and a larger cross sectional area, than the orifice 28, providing a flow resistance as low as possible, that is, permitting a substantially free flow of the fluid between the fluid chambers 14 and 16.

Figure 3:
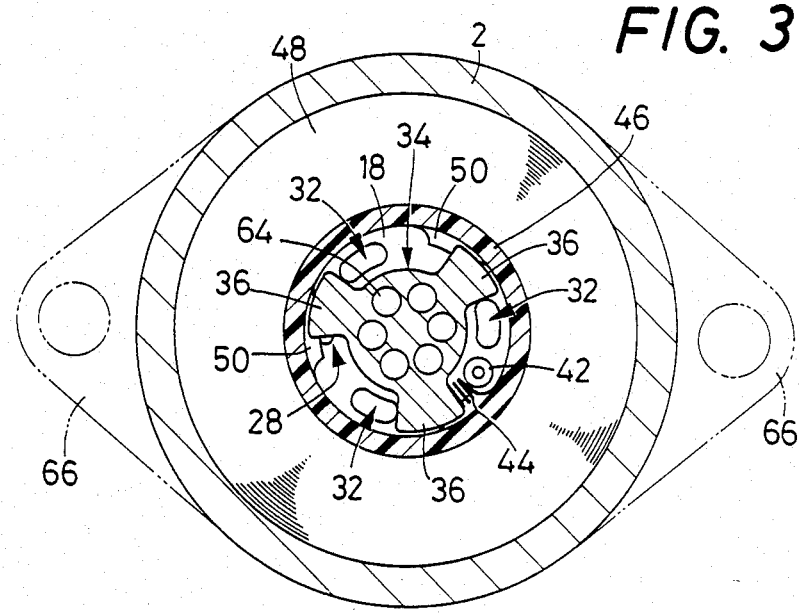
FIG. 3 is a view similar to FIG. 2, showing another operating position of the mounting structure.
Figure 4:
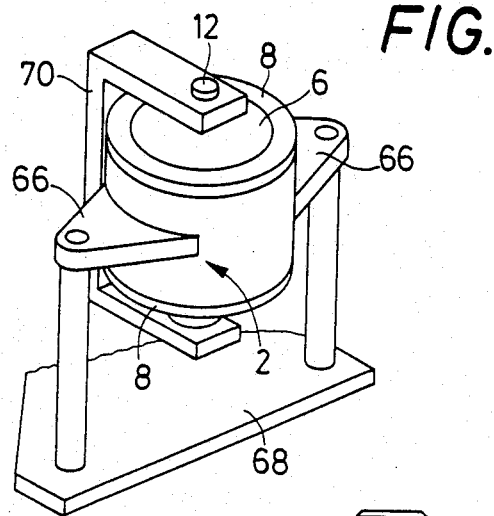
FIG. 4 is a perspective view illustrating one form of installation of the mounting structure of FIG. 1.

The opposite bottom walls of the cup-shaped portions 18a of the upper and lower partition blocks 18 have a pair of opposed recesses 33 having a circular shape (as seen in a plane perpendicular to the axis of the metal housing 2)). Each recess 33 is formed with a central hole 40 which accommodates a shaft portion 38 of a rotary valve member 34. Described in detail, the rotary valve member 34 is supported by the bottom walls of the cup-shaped portions 18a of the partition blocks 18, so that the valve member 34 is rotatable within a predetermined angular range, about the axis of the metal housing 2, i.e., about the shaft portions 38 which extend from the opposite surfaces of the valve member 34 in the opposite directions along the axis of the metal housing 2. The rotary valve member 34 has a rectangular shape (as seen in FIG. 1). As shown in FIGS. 2 and 3, the rotary valve member 34 has three radial protrusions 36, which are equiangularly spaced apart from each other in the direction of rotation of the valve member. These three radial protrusions 36 correspond to the three by-pass passages 32, and have a surface area which is sufficient to close the corresponding by-passage passages 32 at their middle position. In other words, each protrusion 36 is adapted to close the opposite open ends of the communication holes 30, 30 which are open in the bottom surfaces of the cup-shaped portions 18a of the upper and lower partition blocks 18, 18.

The lower partition block 18 has a stopper boss 42 extending from the bottom surface of its cup-shaped portion 18a toward the upper partition block 18, as indicated in FIG. 2. This stopper boss 42 is designed to abut on one of the radial protrusions 36 of the rotary valve member 34, for stopping a rotary motion of the valve member 34. With the stopper boss 42 abutting on the appropriate radial protrusion 36, the by-pass passages 32 are all closed by the corresponding radial protrusions 36, as shown in FIG. 2. Described more particularly, the rotary valve member 34 is rotatable between its closed position of FIG. 2 defined by the stopper boss 42, and its open position of FIG. 3 in which the by-pass passages 32 are not closed by the corresponding radial protrusions 36. The valve member 34 is biased in a circumferential direction toward its closed position of FIG. 2, by biasing means in the form of a coil spring 44 disposed between the stopper boss 42, and one of the radial protrusions 36 which is adjacent to the above-indicated one radial protrusion 36 that is abuttable on the stopper boss 42.

An annular solenoid coil 48 is embedded in an annular space formed in an axially intermediate thick-walled portion 39 of the metal housing 2 which defines the small-diameter portion of the stepped-diamter bore in which the cup-shaped portions 18a are fitted. The solenoid coil 48 is enclosed by an annular bobbin 46 made of a suitable electrically insulating material such as plastics. To facilitate the assembling of the solenoid coil 48 and the annular bobbin 46, the metal housing 2 is divided into the two longitudinal sections 2a and 2b, as previously described. The solenoid coil 48 is disposed coaxially with the metal housing 2, and with the rotary valve member 34, such that the coil 48 surrounds the periphery the rotary valve member 34.

The intermediate thick-walled portion 49 of the metal housing has three radial projections 50 (FIGS. 2 and 3), which protrude from the inner surface of the thick-walled portion 49 in the radially inward direction of the metal housing 2 toward the rotary valve member 34. These three radial projections 50 are equally spaced apart from each other circumferentially of the metal housing 2, as shown in FIGS. 2 and 3. Each radial projection 50 extends axially of the metal housing 2, as indicated in FIG. 1. Each radial projection 50 has a circumferential width almost equal to the circumferential width of the radial protrusion 36 of the rotary valve member 34, as indicated in FIG. 2. In the axially intermediate part of the radial projections 50, there are formed cutouts 52 (FIG. 1) which permit the radial protrusion 36 to pass therethrough. The metal housing 2 and the rotary valve member 34 are made of suitable ferromagnetic materials such as steel, while the two partition blocks 18 are made of non-magnetic materials such as aluminum. While the solenoid coil 48 is not energized, the rotary valve member 34 is placed in its closed position of FIG. 2 in which each radial protrusion 36 is located between the corresponding two adjacent radial projections 50 of the metal housing 2, in the circumferential direction. In this closed position, however, each radial protrusion 36 is located nearer to one of the adjacent radial projections 50 than to the other, in the circumferential direction of the metal housing 2. Namely, each radial protrusion 36 is located at a position which is offset by a predetermined distance from the middle point between the two adjacent radial projections 50, in the direction opposite to the biasing direction of the coil spring 44. In this arrangement, therefore, a magnetic force produced upon energization of the solenoid coil 48 will cause the radial protrusions 36 of the rotary valve member 34 to be magnetically attracted to the nearer radial projections 50, and moved into the cutouts 52. Thus, the rotary valve member 34 is rotated in the direction against the biasing force of the coil spring 44. That is, the rotary valve member 34 is operated to its open position of FIG. 3, while compressing the coil spring 44.

As indicated above, a magnetic path is produced so as to cover the radial projections 50 of the metal housing 2, and the corresponding radial protrusions 36 of the rotary valve member 34 upon energization of the solenoid coil 48. The radial projections 50 and the radial protrusions 36 serve as pole teeth, while a portion of the metal housing 2 serves as a yoke member which is magnetized by the solenoid coil 48. Further, the radial protrusions 36 of the rotary valve member 34 function as closure means for closing the by-pass passages 32, as well as function as the pole teeth.

The solenoid coil 48 is energized under the control of a control device 56 as shown in FIG. 1. The control device 56 is adapted to receive signals from various sensors 58 for detecting running conditions of a vehicle and/or operating conditions of its engine. For example, the sensors 58 include a speed sensor, a sensor for detecting an amount of operation of an accelerator pedal, and a sensor for detecting an operating position of a shift lever. The control device 56 includes logic circuits for processing the signals from these sensors 58 to monitor the vehicle running conditions and the engine operating conditions, and controlling an energization current (power) to be applied to the solenoid coil 48. Thus, the solenoid coil 48 is energized and deenergized by the control device 56.

A pair of opposed movable rings 60 are accommodated in the previously indicated circular recesses 33 formed in the opposite bottom walls of the cup-shaped portions 18a of the partition blocks 18. These movable rings 60 are thin annular members which are made, for example, of plastics, and which have central holes through which the shaft portions 38 of the rotary valve member 34 extend. As described later in greater detail, the movable rings 60 are movable over a very small distance in the direction of their thickness, within the corresponding circular recesses 33, between the rotary valve member 34 and the corresponding cup-shaped portions 18a of the partition blocks 18, when the movable rings 60 receive pressures of the fluid upon application of vibrational loads to the elastic bodies 6 in the axial direction of the metal housing 2.

The upper and lower partition blocks 18 have a plurality of holes 62 fomed through the bottom walls of their cup-shaped portions 18a. The holes 62 are spaced apart from each other in the circumferential direction of the partition blocks 18. In the meantime, the rotary valve member 34 has holes 64 which are formed through the thickness thereof such that the holes 64 are equiangularly spaced from each other along a circle concentric with the valve member 34, as indicated in FIGS. 2 and 3. The holes 62 and 64 permit fluid communication between the first and second fluid chambers 14, 16, only when the two movable rings 60 are placed in their neutral position. More specifically, the upper and lower movable rings 60 receive the fluid pressures in the first and second fluid chambers 14, 16 through the holes 62 when the volumes of the fluid chambers 14, 16 are changed due to displacement of the elastic bodies 6 upon application of a vibrational load to the mounting structure. If the pressure in the first or upper fluid chamber 14 is raised while the pressure in the second or lower fluid chamber 16 is lowered, the upper movable ring 60 is moved downward by the pressure in the first fluid chamber 14, and is eventually seated on the corresponding surface of the rotary valve member 34. As a result, the openings of the holes 64 are closed by the upper movable ring 60. In the meantime, the lower movable ring 60 is also moved downward and seated on the corresponding bottom surface of the lower partition block 18, whereby the holes 62 in the lower partition block 18 are closed by the lower movable ring 60. On the other hand, if the pressure in the second or lower fluid chamber 16 becomes lower than that in the first fluid chamber 14, the upper and lower movable rings 60 are moved upward, whereby the holes 62 in the upper partition block 18 and the holes 64 in the valve member 34 are closed by the upper and lower movable rings 60, respectively. When high-frequency vibrations are applied to the elastic bodies 6, the above-described lower and upper movements of the movable rings 60 are repeated to absorb or accommodate the vibrational energy.

The metal housing 2 has a pair of flanges 66 formed integrally with the upper longitudinal section 2a which extend radially outwardly in diametrically opposite directions as shown in FIG. 2. The mounting structure which has been constructed as described hitherto is installed between the power unit and the vehicle body as previously indicated. Namely, the flanges 66 are connected to a part 68 of the vehicle body (or to a part of the power unit), while the mounting members 12 fixed to the elastic bodies 6 are connected to a part of the power unit (or to the body member 68) by mean of a C-shaped bracket 70. The bracket 70 includes a pair of opposed arms which have tapped holes adapted to engage the externally threaded shaft portions 12a of the mounting members 12. The mounting structure is positioned such that the elastic bodies 6 are able to receive primary vibrations of the vehicle body and the power unit. Namely, the axis of the metal housing 2 is oriented in the direction in which the primary vibrations take place, in order to enable the mounting structure to serve as a vibration damping device between the power unit and the vehicle body, as described below.

Figure 5:
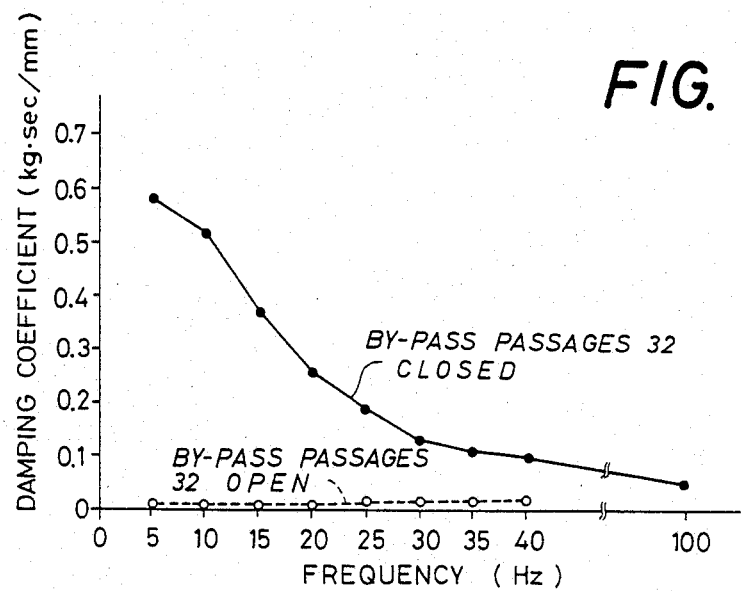
FIGS. 5 and 6 are graphs showing operating characteristics of the mounting structure of FIG. 1.

While no electric current is applied to the solenoid coil 48 from the control device 56, the rotary valve member 34 is held in its closed position of FIG. 2 by the biasing force of the spring 44 and the stopper boss 44. In this closed position of the valve member 34, the radial protrusions 36 close the corresponding by-pass passages 32, inhibiting the by-pass passages 32 from effecting fluid communication between the first and second fluid chambers 14, 16. In this condition, the two fluid chambers 14, 16 communicate with each other only through the orifice 28 formed between the partition member 4 and the metal housing 2. That is, the orifice 28 permits a restricted flow of the fluid between the two fluid chambers 14, 16. The cross sectional area and length of the orifice 28 are suitably selected to provide an intended degree of resistance to flow of the fluid therethrough. Consequently, this flow resistance or flow restriction of the orifice 28 serves to provide a vibration damping effect, upon application of a vibrational load to the mounting structure, which causes the fluid to flow through the orifice from one of the two fluid chambers 14, 16 to the other. The vibration damping by means of this restricted fluid flow through the orifice 28 is effective for the vibrations of low frequencies up to about 40 Hz, as indicated in FIG. 5, particularly for the vibrations of up to about 10 Hz such as shaking vibrations of the engine.

When the solenoid coil 48 is energized by a signal from the control device 56, the rotary valve member 34 is rotated to its open position of FIG. 3 against the biasing action of the spring coil 44, with their radial protrusions 36 being attracted to the corresponding radial projections 50 of the metal housing 2. With the valve member 34 held in this open position, the by-pass passages 32 are all kept in their open position, allowing fluid communication between the first and second fluid chambers 14, 16. Since the by-pass passages 32 have a sufficiently larger cross sectional area of communication and a sufficiently small length than the orifice 28, the by-pass passages 32 permit substantially free communication of the fluid between the two fluid chambers 14, 16, with a very small resistance to flows of the fluid through the by-pass passages 32. Hence, the fluid flow through the by-pass passages 32 will provide no effective attentuation of the input vibrations, as indicated in broken line in FIG. 5.

As described above, while the by-pass passages 32 are open, the fluid is permitted to flow freely between the two fluid chambers 14, 16 through the by-pass passages 32, in response to elastic deformation of the elastic bodies 6 due to vibrations applied thereto. In other words, the fluid pressures in the fluid chambers 14, 16 will not prevent elastic deformation of the elastic bodies 6. Therefore, the elastic bodies 6 are easily deformed in response to the applied vibrations, exhibiting soft spring characteristics, i.e., relatively low dynamic spring rate for the vibrations in a relatively low frequency range, as indicated in broken line in FIG. 6. As a result, the elastic bodies 6 effectively attentuate idling vibrations of the engine (generally of 10–40 Hz approx.) which occur while the engine is idling with the vehicle stopped. Thus, the engine vibrations to be transmitted to the vehicle body are effectively reduced.

In an automotive vehicle, it is important to avoid transmission of the engine idling vibrations from the power unit to the body of the vehicle. With the mounting structure of the invention illustrated above, such idling vibrations are effectively insulated or isolated by means of the soft spring characteristics of the elastic bodies 6 which are demonstrated while the by-pass passages 32 are open. To this end, the solenoid coil 48 is energized by the control device 56 in order to operate the rotary valve member 34 to its open position in which the by-pass passages 32 are open. Generally, high damping characteristics of a vibration damper to prevent shaking vibrations of an engine in a low frequency range (e.g., up to about 40 Hz) is not available toether with soft spring characteristics effective to isolate idling vibrations of the engine in such low frequency range. However, these two generally incompatible characteristics are selectively offered on the present mounting structure, by way of closing and opening the by-pass passages 32 under the control of the control device 56, depending upon the conditions of the vehicle.

Figure 6:
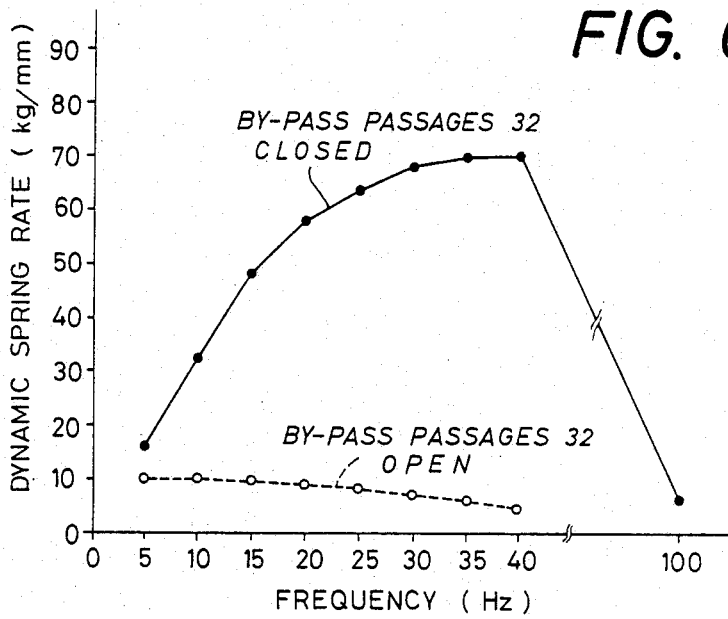

When high-frequency vibrations are aplied to the mounting structure while the by-pass passages 32 are closed and the two fluid chambers 14, 16 communicate with each other through the orifice 28, the fluid is difficult to flow between the fluid chambers 14, 16 through the orifice 28 due to the inertia of the fluid masses in the chambers 14, 16. Further, when the frequency of the vibrations applied to the mounting structure is higher than 100 Hz, the inertia of the fluid masses will act to make it difficult for the fluid to flow between the two chambers 14, 16 even through the by-pass passages 32 while they are open. In such conditions, the fluid masses contained in the fluid chambers 14, 16 will prevent the elastic bodies 6 from being elastically deformed. However, variations in the fluid pressures in the first and second fluid chambers 14, 16 will cause repeated upward and downward oscillations of the upper and lower movable rings 60 within the circular recesses 33, thereby preventing an excessive rise in the fluid pressure in each one of the fluid chambers 14, 16 upon application of high-frequency vibrations to the mounting structure. Therefore, the elastic bodies 6 may exhibit a low dynamic spring rate to the vibrations of high frequencies around 100 Hz, for example, as indicated in FIG. 6. In other words, the oscillating movements of the movable rings 60 contribute to absorption or accommodation of a high-frequency vibrational energy input to the mounting structure. This damping characteristics is effective to minimize noises which are produced during a high speed run of the vehicle.

The foregoing different vibration damping or isolating characteristics of the instant mounting structure are offered by the movable rings 60, rotary valve member 34 for closing and opening the by-pass passages 32, solenoid coil 48 for operating the valve member 34 between its closed and open positions, and other components, all of which are incorporated compactly in the comparatively small-sized metal housing 2. None of those components project out of the metal housing 2. Thus, the present mounting structure requires an installation space almost equal to that required for a conventional mounting structure which does not provide such features or capabilities as described above.

Figure 7:
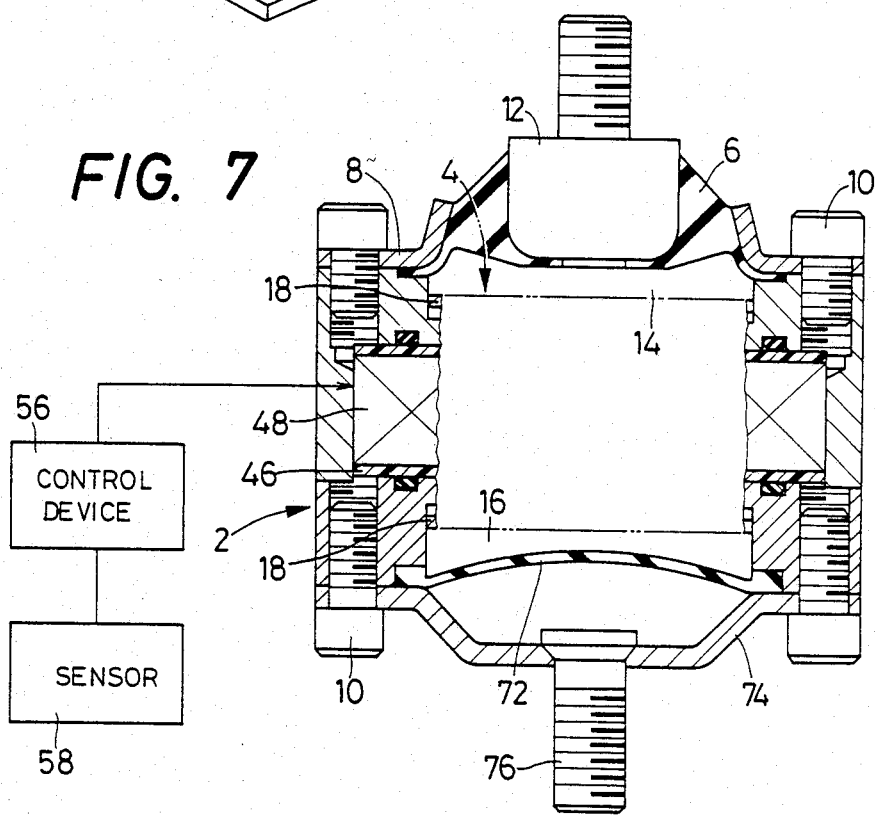
FIG. 7 is a view corresponding to FIG. 1, showing another embodiment of the invention.

A modified embodiment of the present invention is illustrated in FIG. 7.

In this modified embodiment, the second or lower fluid chamber 16 is partly defined by a lower elastic body in the form of a diaphragm 72 which has a small thickness and is formed of a rubber material. This diaphragm 72 is fluid-tightly attached at its periphery to the metal housing 2 by means of a metallic covering member 74. The covering member 74 is fixed to the lower end of the metal housing 2 by the bolts 10, such that periphery of the diaphragm 72 is squeezed between the covering member 74 and the metal housing 2. The covering member 74 is provided at its central portion with a mounting member 76 which is functionally equivalent to the mounting member 12 fixed to the upper elastic body 6 partly defining the first or upper fluid chamber 14.

The mounting structure shown in FIG. 7 is connected at the mounting member 76 to the vehicle body 76, and at the mounting member 12 to the power unit. This mounting structure has the same components associated with the partition member 4, as used in the preceding embodiment. The assembly of these components is indicated in two-dot chain line in FIG. 7. For the other components, the same reference numerals as used in FIG. 1 are used in FIG. 7 to identify the corresponding parts.

In the above modified embodiment of the mounting structure, a decrease or increase in the volume of the first fluid chamber 14 upon input of a vibrational force to the corresponding mounting member 12 will cause the diaphragm 72 to be elastically deformed in a direction to increase or decrease the volume of the second fluid chamber 16 (which is considered as an equilibrium chamber). Thus, the mounting structure of FIG. 7 performs substantially the same functions and provides substantially the same results, as the preceding embodiment.

While the illustrated embodiments use the two movable rings 60 (as shown in FIG. 1), it is possible to use a single movable ring which is slightly movable by fluid pressures in the first and second fluid chambers 14, 16. Further, it is not necessary to arrange such a movable ring so that its entire structure is movable. For example, it is possible to use an elastic movable ring made of a rubber or other elastic material, which is fixedly supported at its periphery so that its central portion is elatically deformable due to change in pressure in the first and second fluid chambers 14, 16.

Although the movable rings 60 are disposed so as to receive the pressures in the fluid chambers 14, 16 through the holes 62, the movable rings 60 may be replaced by other types of pressure-receiving means, for example, thin-walled rubber members which contribute to defining the first and second fluid chambers 14, 16 and which are elastically deformable in a slight degree in response to changes in the pressures in the fluid chambers 14, 16.

While it is preferred to use pressure-receiving means like the movable rings 60 employed in the illustrated embodiments, the present invention may be embodied without such pressure-receiving means. In this instance, too, the mounting structure may exhibit high damping characteristics for damping shaking vibrations of the vehicle engine, and relatively soft spring characteristics for isolating idling vibrations of the engine, which different characteristics being selectively offered by opening and closing the by-pass passages 32 depending upon the conditions of the vehicle, as previously discussed.

Although the illustrated embodiments have the three by-pass passages 32, the number of the by-pass passages 32 may be suitably selected. For example, a single by-pass passage may be provided. In this instance, the rotary valve member 34 is modifed to have a single radial protrusion to close that single by-pass passage. Further, the rotary actuator for rotating the rotary valve member 34 is not limited to an electromagnetic arrangement including the solenoid coil 48. For example, the rotary valve member 34 may be operated between its open and closed positions by means of a pressurized fluid which is fed into and discharged out of two independent pressure chambers that are formed between the metal housing 2 and the rotary valve member 34. In an alternative arrangement, the rotary valve member 34 is biased toward one of the two positions by a spring, and operated to the other position with a pressurized fluid fed into a suitable pressure chamber.

It will be understood that the present invention may be embodied with other changes, modifications and improvements which may occur to those skilled in the art, within the scope of the invention defined in the appended claims.

What is claimed is:

1. A mounting structure disposed between a body and a power unit of a vehicle for mounting of the power unit on the body, including (a) partition means, (b) a first and a second elastic member which cooperate with said partition means to define at least partially a first and a second fluid chamber on opposite sides of said partition means, respectively, said first and second fluid chambers being filled with an incompressible fluid and having volumes which are variable due to elastic deformation of said elastic members, respectively, and (c) means for defining an orifice which communicates with said first and second fluid chambers to permit a restricted flow of the fluid therebetween, said orifice providing a predetermined resistance to flow of the fluid therethrough, the elastic deformation of said elastic members and the flow resistance of said orifice enabling the mounting structure to damp or absorb vibrations applied thereto, said mounting structure comprising:

by-pass means for defining at least one by-pass passage formed through said partition means to permit fluid communication between said first and second fluid chambers;

a rotary valve member disposed within said partition means and made of a magnetic material, said valve member being rotatable about its axis through a predetermined angle between its closed position in which said at least one by-pass passage is closed by the rotary valve member, and its open position in which said at least one by-pass passage is open; and a rotary actuator, responsive to an external signal, for operating said rotary valve member between said closed and open position, said rotary actuator comprising a biasing spring for biasing said rotary valve member toward one of said closed and open position, and an annular solenoid coil disposed around and coaxially with said rotary valve member, said solenoid coil being energized in response to said external signal, to rotate said rotary valve member to the other of said closed and open positions against a biasing force of said biasing spring.

2. A mounting structure of claim 1, wherein said rotary actuator is connected to a control device which produces said external signal in response to a signal from a sensor which senses conditions of said vehicle and said power unit.

3. A mounting structure of claim 1, wherein said partition means comprises a cylindrical metal housing, and a partition member disposed within said metal housing so as to divide an interior of said metal housing into two cavities which are spaced apart by said partition member in an axial direction of the metal housing, said pair of elastic members closing said two cavities to form said first and second fluid chambers, respectively, said pair of elastic members being formed with a corresponding pair of mounting members secured thereto, the mounting structure being attached at said mounting members to one of said body and power unit of the vehicle, and at said metal housing to the other of said body and said power unit.

4. A mounting structure of claim 3, wherein said cylindrical metal housing is made of a magnetic material, and said annular solenoid coil is embedded in said metal housing so as to surround said rotary valve member, a portion of said metal serving as a yoke member which is magnetized upon energization of said solenoid coil.

5. A mounting structure of claim 4, wherein said metal housing includes at least one radial projection radially inwardly protruding from an inner surface thereof toward said rotary valve member, while said rotary valve member includes at least one radial protrusion which corresponds to said at least one radial projection and which radially outwardly protrudes toward the inner surface of said metal housing, said at least one radial projection and said at least one radial protrusion being magnetically attracted toward each other to rotate said rotary valve member to said other of the closed and open positions, upon energization of said solenoid coil, said at least one radial protrusion of said rotary valve member closing said at least one by-pass passage when said rotary valve member is placed in said closed position.

6. A mounting structure of claim 5, wherein said second elastic member associated with said second fluid chamber consists of a thin layer of an elastic material which is elastically deformed in response to a variation in the volume of said first fluid chamber upon application of a vibrational load to said first elastic member.

7. A mounting structure disposed between a body and a power unit of a vehicle for mounting of the power unit on the body, including (a) partition means, (b) a first and a second elastic member which cooperate with said partition means to define at least partially a first and a second fluid chamber on opposite sides of said partition means, respectively, said first and second being filled with an incompressible fluid and having volumes which are variable due to elastic deformation of said elastic members, respectively, and (c) means for defining an orifice which communicates with said first and second fluid chambers to permit a restricted flow of the fluid therebetween, said orifice providing a predetermined resistance to flow of the fluid therethrough, the elastic deformation of said elastic members and the flow resistance of said orifice enabling the mounting structure to damp or absorb vibrations applied thereto, said mounting structure comprising:

by-pass means for defining at least one by-pass passage formed through said partition means to permit fluid communication between said first and second fluid chambers;

a rotary valve member disposed within said partition means and rotatable about its axis through a predetermined angle between its closed position in which said at least one by-pass passage is closed by the rotary valve member, and its open position in which said at least one by-pass passage is open;

a rotary actuator, responsive to an external signal, for operating said rotary valve member between said closed and open position; and pressure-receiving means disposed to receive at least one of pressures in said first and second fluid chambers, and movable in a direction to reduce the pressure which has moved said pressure-receiving means in said direction.

8. A mounting structure of claim 7, wherein said pressure-receiving means is disposed between said first and second fluid chambers so as to receive the pressures in the fluid chambers, and is movable in a direction in which said vibrations are applied to the mounting structure through said elastic members.

9. A mounting structure of claim 8, wherein said pressure-receiving means comprises at least one hole which is formed through said partition means and said rotary valve member in a direction parallel to said axis of the rotary valve member, to permit said first and second fluid chambers to communicate with each other, and further comprises a pair of generally planar movable members disposed adjacent to opposite surfaces of said rotary valve member movably along said axis with said pressures so that each of said movable members is seated on corresponding one of said opposite surfaces of the rotary valve member, to close said at least one hole at said corresponding one of the opposite surfaces of the rotary valve member.

* * * * *